US012624229B2

(12) United States Patent     (10) Patent No.:   US 12,624,229 B2

Jackson, III et al.     (45) Date of Patent:    May 12, 2026

(54) ENVIRONMENTAL BARRIER COATING WITH THERMAL RESISTANCE

(71) Applicant: Raytheon Technologies Corporation, Farmington, CT (US)

(72) Inventors: Richard Wesley Jackson, III, Mystic, CT (US); Xia Tang, West Hartford, CT (US); James T. Beals, West Hartford, CT (US); David A. Litton, West Hartford, CT (US); Brian T. Hazel, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 685 days.

(21) Appl. No.: 17/991,707

(22) Filed: Nov. 21, 2022

(65) Prior Publication Data

US 2024/0166890 A1     May 23, 2024

(51) Int. Cl.

| | |
|---|---|
| *C09D 5/32* | (2006.01) |
| *C04B 41/00* | (2006.01) |
| *C04B 41/50* | (2006.01) |
| *C04B 41/52* | (2006.01) |
| *C04B 41/89* | (2006.01) |
| *C04B 111/00* | (2006.01) |
| *C09D 7/61* | (2018.01) |

(52) U.S. Cl.
CPC ............. *C09D 5/32* (2013.01); *C04B 41/009* (2013.01); *C04B 41/5036* (2013.01); *C04B 41/5066* (2013.01); *C04B 41/52* (2013.01); *C04B 41/89* (2013.01); *C09D 7/61* (2018.01); *C04B 2111/00258* (2013.01)

(58) Field of Classification Search
None
See application file for complete search history.

(56) References Cited

U.S. PATENT DOCUMENTS

| | | | |
|---|---|---|---|
| 5,355,668 A | 10/1994 | Weil et al. | |
| 6,925,811 B2 | 8/2005 | Justis et al. | |
| 7,666,512 B2 | 2/2010 | Bhatia et al. | |
| 2009/0075115 A1* | 3/2009 | Tryon ................... | C23C 28/325 |
| | | | 428/656 |
| 2013/0177772 A1* | 7/2013 | Schaeffer ............... | C23C 28/34 |
| | | | 252/62 |
| 2017/0101883 A1* | 4/2017 | Chamberlain .......... | C04B 41/89 |
| 2024/0011403 A1* | 1/2024 | Chen ...................... | C23C 28/04 |

FOREIGN PATENT DOCUMENTS

| | | |
|---|---|---|
| CN | 110002900 | 7/2019 |
| CN | 111732457 | 10/2020 |
| EP | 3838872 A1 | 6/2021 |

OTHER PUBLICATIONS

Helmenstine (Concentration Definition (Chemistry) (Year: 2019).*
European Search Report for EP Application No. 23210891.0 dated Apr. 26, 2024.

* cited by examiner

*Primary Examiner* — David Sample
(74) *Attorney, Agent, or Firm* — Carlson, Gaskey & Olds, P.C.

(57) ABSTRACT

An article includes a substrate and a bond coat disposed on the substrate. The bond coat includes a matrix, a plurality of gettering particles disposed in the matrix, a plurality of diffusive particles disposed in the matrix, a radiation-absorbing component disposed in the matrix, wherein the radiation-absorbing component is concentrated at an outer surface of the bond coat. An article and a method of protecting an article are also disclosed.

16 Claims, 4 Drawing Sheets

ENVIRONMENTAL BARRIER COATING WITH THERMAL RESISTANCE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a substrate and a bond coat disposed on the substrate. The bond coat includes a matrix, a plurality of gettering particles disposed in the matrix, a plurality of diffusive particles disposed in the matrix, a radiation-absorbing component disposed in the matrix, wherein the radiation-absorbing component is concentrated at an outer surface of the bond coat.

In a further example of any of the foregoing, the radiation-absorbing component includes at least one of wherein the radiation-absorbing component includes at least one of transition metal oxides, phosphorescing rare earth ions, lanthanide metals, lanthanide metal oxides, lanthanide silicates, and alloys of rare-earth metals with lanthanide metals.

In a further example of any of the foregoing, the radiation-absorbing component includes at least one of $La_2NiO_4$ and $LaFeO_3$.

In a further example of any of the foregoing, the at least some of the diffusive particles are the radiation-absorbing component.

In a further example of any of the foregoing, at least about 75% of the radiation-absorbing component 200 is dispersed in the outer 25% of a thickness of the bond coat.

In a further example of any of the foregoing, the radiation-absorbing component includes a first material that absorbs radiation in a first range of wavelengths and a second material that absorbs radiation in a second range of wavelengths different from the first range.

In a further example of any of the foregoing, the radiation-absorbing component absorbs radiation in the infrared range.

In a further example of any of the foregoing, the article includes an oxide-based topcoat interfaced with an outer surface of the bond coat.

In a further example of any of the foregoing, the topcoat includes the radiation-absorbing component.

In a further example of any of the foregoing, the substrate is a ceramic matrix composite.

An article according to an exemplary embodiment of this disclosure, among other possible things include a substrate and a bond coat disposed on the substrate. The bond coat includes a matrix, a plurality of gettering particles disposed in the matrix, a plurality of diffusive particles disposed in the matrix, and an oxide-based topcoat interfaced with an outer surface of the bond coat. The topcoat includes a radiation-absorbing component.

In a further example of the foregoing, the radiation-absorbing component includes at least one of wherein the radiation-absorbing component includes at least one of transition metal oxides, phosphorescing rare earth ions, lanthanide metals, lanthanide metal oxides, lanthanide silicates, and alloys of rare-earth metals with lanthanide metals.

In a further example of any of the foregoing, the radiation-absorbing component includes at least one of $La_2NiO_4$ and $LaFeO_3$.

In a further example of any of the foregoing, wherein the radiation-absorbing component includes a first material that absorbs radiation in a first range of wavelengths and a second material that absorbs radiation in a second range of wavelengths different from the first range.

In a further example of any of the foregoing, the radiation-absorbing component absorbs radiation in the infrared range.

In a further example of any of the foregoing, the topcoat includes an inner layer interfaced with the outer surface of the bond coat and an outer layer disposed on the inner layer. The outer layer includes the radiation-resistance component.

In a further example of any of the foregoing, the bond coat includes the radiation-resistance component disposed in the matrix.

A method of protecting an article according to an exemplary embodiment of this disclosure, among other possible things include providing a barrier layer on an article. The barrier layer includes a bond coat disposed on the substrate. The bond coat includes a matrix, a plurality of gettering particles disposed in the matrix, a plurality of diffusive particles disposed in the matrix, and an oxide-based topcoat interfaced with an outer surface of the bond coat. At least one of the bond coat and the topcoat include a radiation-absorbing component that absorbs radiation in the infrared range.

In a further example of any of the foregoing, the radiation-absorbing component is in the bond coat. The radiation-absorbing component is concentrated at an outer surface of the bond coat.

In a further example of any of the foregoing, wherein the topcoat includes an inner layer interfaced with the outer surface of the bond coat and an outer layer disposed on the inner layer. The outer layer includes the radiation-resistance component.

DETAILED DESCRIPTION

Figure 1:
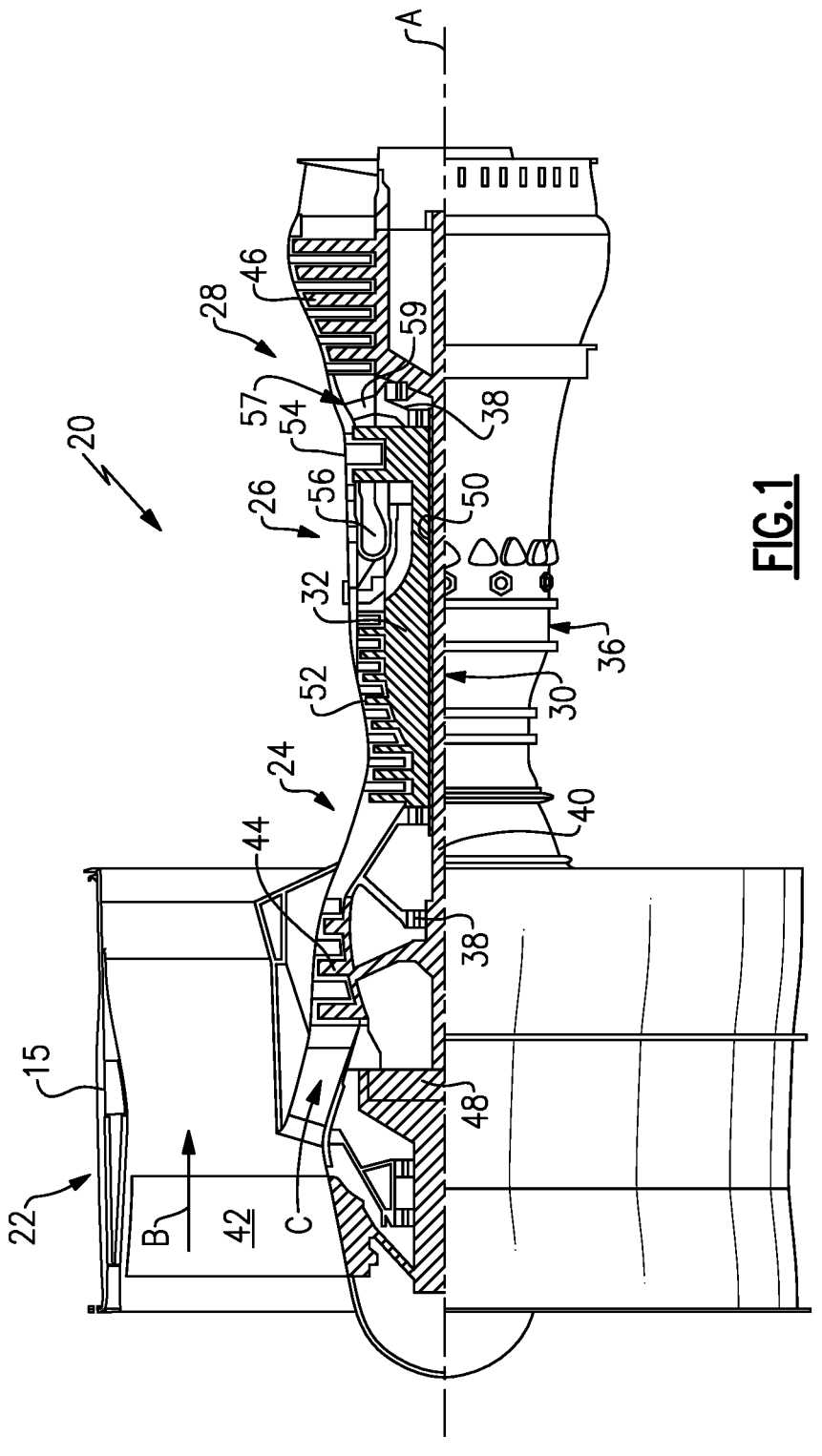
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures as well as turboprops.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram \,^\circ R)/(518.7^\circ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
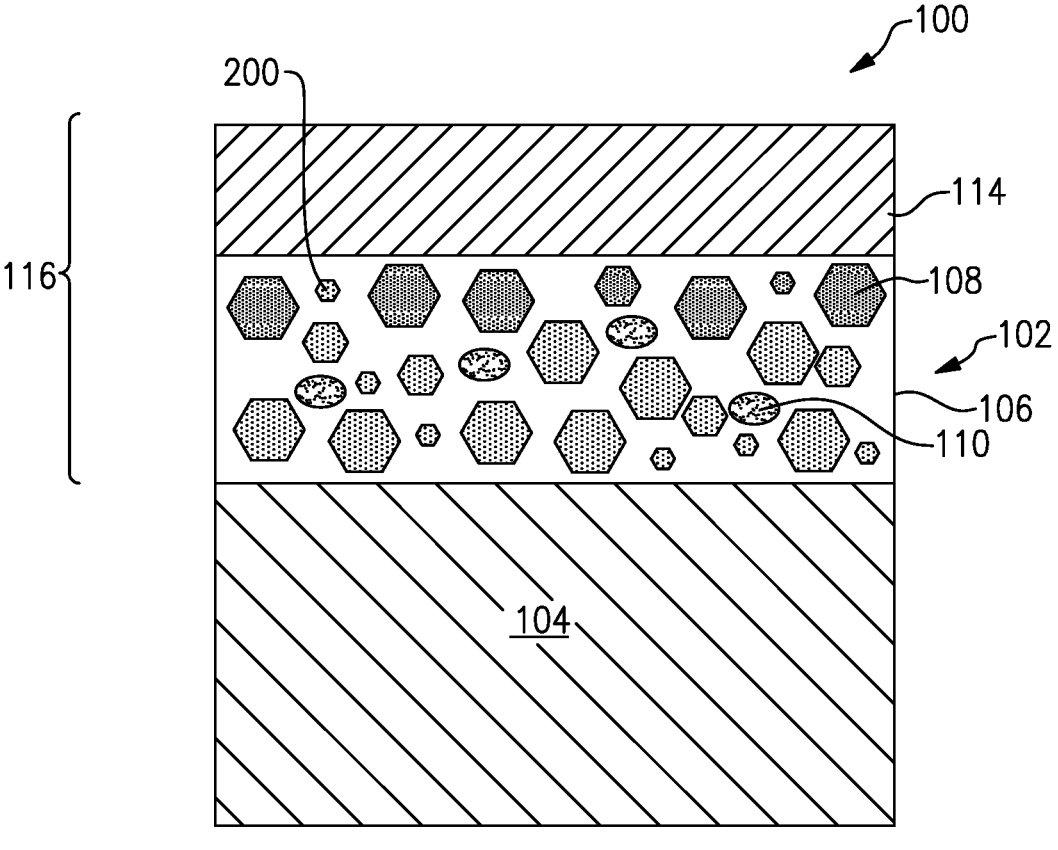
FIG. 2 illustrates an example article with a barrier layer.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

A ceramic-based top coat 114 may be interfaced directly with an outer surface of the bond coat 102. The top coat 114 and bond coat 102 together form a barrier coating 116 for the substrate 104. The top coat 114, when used, is the outermost layer of the barrier coating 116, and is exposed to the elements when the article 100 is in use. The top coat 114 includes an oxide-based material. The oxide-based material can be, for instance, hafnium-based oxides or yttrium-based oxides (such as hafnia, hafnium silicate, yttrium silicates, ytterbium silicates, other rare-each silicates, yttria stabilized zirconia or gadolinia stabilized zirconia), calcium aluminosilicates, mullite, barium strontium aluminosilicate, or combinations thereof, but is not limited to such oxides.

In some examples, the article 100 is exposed to high temperatures, such as during the operation of engine 20. In the case of CMC articles 100, the CMC material is already capable of withstanding high temperatures. However, the CMC article 100 still benefits from protection from high temperatures because such protection improves its performance and durability, and enables the use of CMC articles 100 in even hotter environments than current designs. Typical barrier coatings have relatively high transmissivity of radiation produced within the engine 20, such as from hot combustion gas, meaning the heat is radiated through the barrier coating and to the underling substrate. However, the present barrier coating 116 includes at least one component that limits the transmission of radiation, and in particular infrared and near-infrared radiation, through the barrier coating 116, thereby protecting the substrate 104 from such radiation.

In one example, shown in FIG. 2, a radiation-absorbing component 200 is dispersed with the gettering particles 108 and self-healing particles 110 in the matrix 106 of the bond coat 102. In a particular example, the radiation-absorbing component 200 comprises between about 10 and about 50 percent by volume of the barrier layer 116.

In one example, the radiation-absorbing component 200 is evenly dispersed throughout the bond coat 102. In another example shown in FIG. 2, a concentration of the radiation-absorbing component 200 is graded through a thickness of the bond coat 102 such that the radiation-absorbing component 200 is more concentrated at an outer surface of the bond coat 102 (the surface nearest the top coat 114) than at an inner surface of the bond coat 102 (the surface nearest the substrate 104). The radiation-absorbing component 200 in this example is concentrated near the outer surface of the bond coat 102 because that is nearest the radiation that the barrier layer 116 may be exposed to and therefore dispersing the radiation-absorbing component 200 in this manner maximizes its effectiveness. However, limiting the concentration of the radiation-absorbing component 200 at the inner surface of the bond coat 102 reduces concerns associated with CTE (coefficient of thermal expansion) mismatch between the bond coat 102 and the substrate 104, discussed in more detail below. In a particular example, at least about 75% of the radiation-absorbing component 200 is dispersed in the outer 25% of the bond coat 102 thickness.

Figure 3:
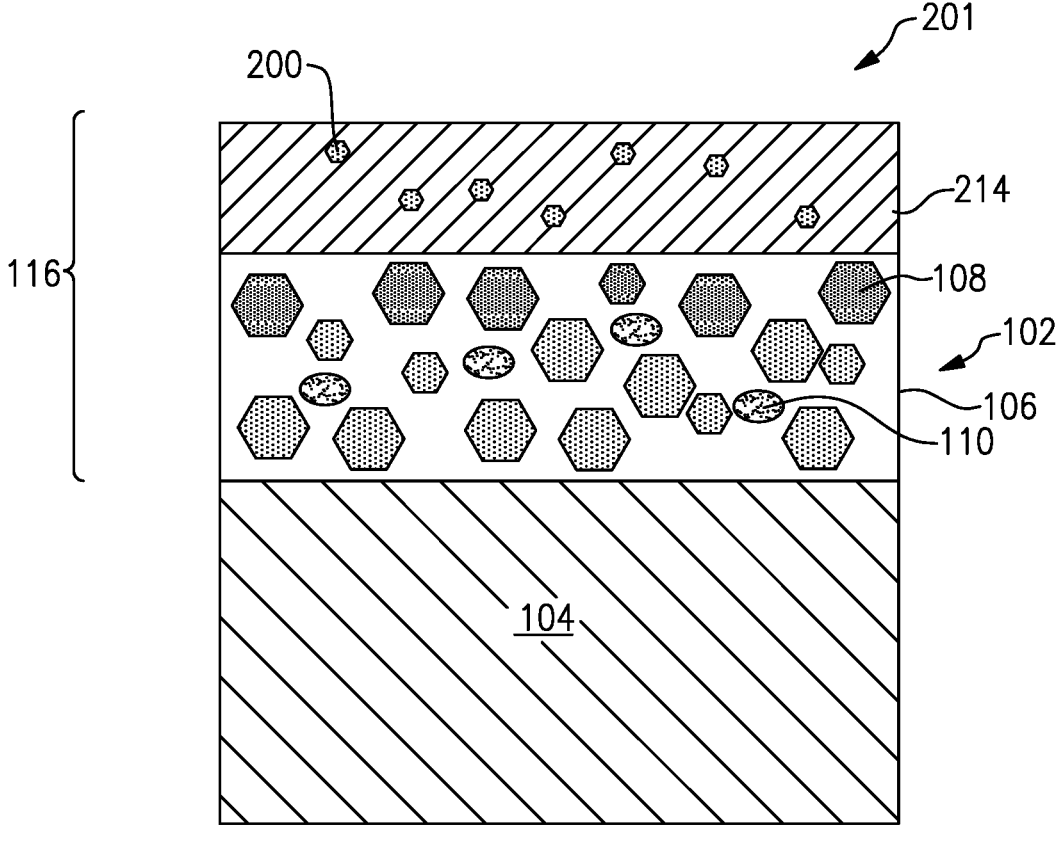
FIG. 3 illustrates another example article with a barrier layer.

In another example, shown in FIG. 3, the article 201 has a radiation-absorbing component 200 dispersed in the top coat 214. In this example, the radiation-absorbing component 200 is evenly dispersed throughout the top coat 214. However, in other examples, the radiation-absorbing component 200 have a graded concentration throughout the thickness of the top coat 114, like in the example discussed above with respect to FIG. 2.

Figure 4:
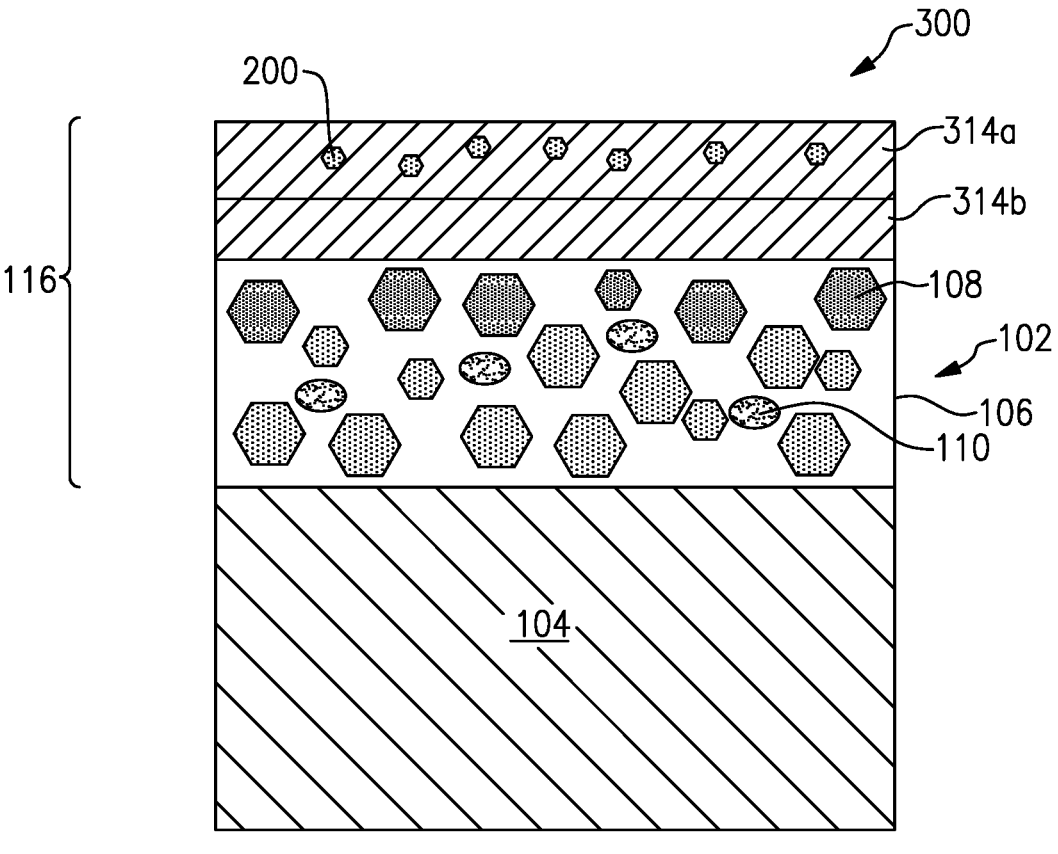
FIG. 4 illustrates another example article with a barrier layer.

In another example, shown in FIG. 4, the article 300 includes a top coat with at least two layers, an outer layer 314a and an inner layer 314b that is interfaced with the bond coat 102. In this example, the radiation-absorbing component 200 is dispersed in the outer layer 314a of the top coat 214.

Though in the examples shown above the radiation-absorbing component 200 is shown in FIGS. 2 and 3, respectively, as being dispersed in either the bond coat 102 or the top coat 114, it should be understood that in either example the radiation-absorbing component 200 can be dispersed in both the bond coat 102 or the top coat 114.

The radiation-absorbing component 200 is particles of one or more materials that absorb radiation, including radiation in the infrared range. In a particular example, the radiation-absorbing component 200 absorbs radiation with wavelengths between about 0.5 and about 3 microns. The radiation-absorbing component 200 may include a single type of particle or multiple types of particles which absorb radiation at different wavelengths. For instance, the radiation-absorbing component 200 may include particles of a first material that absorbs radiation in the near-infrared range and a second material that absorbs radiation in the infrared range.

Example materials for the radiation-absorbing component 200 are transition metal oxides such as $Cr_2O_3$, MnO, NiO, CoO, or FeO, phosphorescing rare earth ions such as $Ce^{3+}$, $Pr^{3+}$, $Nd^{3+}$, $Pm^{3+}$, $Sm^{3+}$, $Yb^{3+}$, $Eu^{3+}$, $Dy^{3+}$, or $Gd^{3+}$, any lanthanide metals, lanthanide metal oxides such as $Gd_2O_3$, lanthanide silicates such as $Gd_2Si_2O_7$ or $Gd_2SiO_5$, or alloys of rare-earth metals with lanthanide metals including di-lanthanide nickelates such as $Pr_2NiO_4$ and $Nd_2NiO_4$. Some particular examples are $La_2NiO_4$, LaFeO3, LaMnO3, LaCoO, and LaNiO3, which may be doped with alkaline earth elements like Mg. For example, $LaFe_{0.75}Mg_{0.25}O_3$, which is a lanthium apatite structure. Other examples are $La_{9.83}Si_{4.5}Ni_{1.5}O_{26}$ and $La_{9.83}Si_{4.5}Fe_{1.5}O_{26}$.

The barrier layer 116 must have good CTE (coefficient of thermal expansion) match with the substrate 104 to minimize the risk of delamination, cracking, or other issues that may arise as the substrate 104/barrier layer 116 undergo temperature changes while in use. For instance, the CTE of the barrier layer is within about 50% of the CTE of the substrate 104. In a further example, the CTE of the barrier layer is within about 40% of the CTE of the substrate 104. However, many radiation-absorbing materials have high CTE compared to CMC substrates 104. The amount of the radiation-absorbing component 200 in the barrier layer 116 as well as its particular location within the barrier layer 116 are selected to minimize CTE mismatch. The character of the barrier layer 116 can also be taken into account. For instance, the matrix 106, gettering particles 108, and diffusive particles 110 can together have a relatively low CTE that is more than about 10% different than the substrate 104 and the radiation-absorbing component 200 in the example of FIG. 2 discussed above can have a relatively high CTE such that the overall CTE of the barrier layer 102 is within about 10% of the CTE of the substrate 104. The radiation-absorbing component 200 is also selected to have good recession resistance. Recession resistance for barrier layers is well known in the art and will not be described herein in detail.

In one example, the radiation-absorbing component 200 particles serve a dual purpose by also acting as diffusive particles 110. That is, at least some of the diffusive particles 110 are also radiation-absorbing.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article, comprising:
a substrate; and
a bond coat disposed on the substrate, the bond coat including:
a matrix;
a plurality of gettering particles disposed in the matrix;
a plurality of diffusive particles disposed in the matrix; and
a radiation-absorbing component disposed in the matrix, wherein the radiation-absorbing component is concentrated at an outer surface of the bond coat, and the radiation-absorbing component includes at least one of $La_2NiO_4$ and $LaFeO_3$.

2. The article of claim 1, wherein the at least some of the diffusive particles are the radiation-absorbing component.

3. The article of claim 1, wherein at least about 75% of the radiation-absorbing component is dispersed in the outer 25% of a thickness of the bond coat.

4. The article of claim 1, wherein the radiation-absorbing component includes a first material that absorbs radiation in a first range of wavelengths and a second material that absorbs radiation in a second range of wavelengths different from the first range.

5. The article of claim 1, wherein the radiation-absorbing component absorbs radiation in the infrared range.

6. The article of claim 1, further comprising an oxide-based topcoat interfaced with an outer surface of the bond coat.

7. The article of claim 6, wherein the topcoat includes the radiation-absorbing component.

8. The article of claim 1, wherein the substrate is a ceramic matrix composite.

9. An article, comprising:
a substrate; and
a bond coat disposed on the substrate, the bond coat including:
a matrix;
a plurality of gettering particles disposed in the matrix;
a plurality of diffusive particles disposed in the matrix; and
an oxide-based topcoat interfaced with an outer surface of the bond coat, the topcoat including a radiation-absorbing component, and the radiation-absorbing component includes at least one of $La_2NiO_4$ and $LaFeO_3$.

10. The article of claim 9, wherein the radiation-absorbing component includes at least one of wherein the radiation-absorbing component includes at least one of transition metal oxides, phosphorescing rare earth ions, lanthanide metals, lanthanide metal oxides, lanthanide silicates, and alloys of rare-earth metals with lanthanide metals.

11. The article of claim 9, wherein the radiation-absorbing component includes a first material that absorbs radiation in a first range of wavelengths and a second material that absorbs radiation in a second range of wavelengths different from the first range.

12. The article of claim 9, wherein the radiation-absorbing component absorbs radiation in the infrared range.

13. The article of claim 9, wherein the topcoat includes an inner layer interfaced with the outer surface of the bond coat and an outer layer disposed on the inner layer, and wherein the outer layer includes the radiation-resistance component.

14. The article of claim 9, wherein the bond coat includes the radiation- resistance component disposed in the matrix.

15. An article, comprising:
a substrate; and
a bond coat disposed on the substrate, the bond coat including:
a matrix;
a plurality of gettering particles disposed in the matrix;
a plurality of diffusive particles disposed in the matrix; and
a radiation-absorbing component disposed in the matrix, wherein the radiation-absorbing component includes a di-lanthanide nickelate.

16. The article as recited in claim 15, wherein the di-lanthanide nickelate is doped with an alkaline earth element.

* * * * *